(12) United States Patent
Sung

(10) Patent No.: US 7,134,777 B2
(45) Date of Patent: Nov. 14, 2006

(54) SURFACE LIGHTING DEVICE WITH CLOSED OBLIQUE REFLECTOR

(75) Inventor: Chang-Chieh Sung, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 170 days.

(21) Appl. No.: 10/807,211

(22) Filed: Mar. 22, 2004

(65) Prior Publication Data

US 2004/0184258 A1    Sep. 23, 2004

(30) Foreign Application Priority Data

Mar. 21, 2003   (TW) ............................... 92204449 U
May 9, 2003    (TW) ............................... 92208565 U
May 23, 2003   (TW) ............................... 92209570 U

(51) Int. Cl.
   *F21V 7/04*    (2006.01)
(52) U.S. Cl. ............... 362/609; 362/612; 362/621; 362/622
(58) Field of Classification Search ......... 362/608–10, 362/609, 610, 611, 612, 613, 614, 615, 616, 362/621, 622, 555, 560
   See application file for complete search history.

(56) References Cited

U.S. PATENT DOCUMENTS 5,876,107 A    3/1999   Parker et al.
6,277,471 B1 *  8/2001   Tang ........................... 428/172
6,293,683 B1 *  9/2001   Okada ......................... 362/610
6,435,687 B1 *  8/2002   Fukiharu ...................... 362/609
6,644,824 B1 * 11/2003   Baba .......................... 362/609
6,685,328 B1 *  2/2004   Hanson et al. ................. 362/610
6,685,330 B1 *  2/2004   Miyazaki ...................... 362/610
6,867,826 B1 *  3/2005   Miyashita ..................... 349/61
2003/0128538 A1 *  7/2003   Shinohara et al. ............ 362/31
2003/0184992 A1 * 10/2003   Miyazaki ..................... 362/31
2004/0100789 A1 *  5/2004   Ju ............................ 362/31

* cited by examiner

*Primary Examiner*—Stephen Husar
*Assistant Examiner*—James W Cranson, Jr.
(74) *Attorney, Agent, or Firm*—Wei Te Chung

(57) ABSTRACT

A surface lighting device (1) includes a light guide plate (11), a point light source (14), and a light reflector (13) substantially juxtaposed with the light guide plate. The light guide plate has a light incident surface (111). The point light source is located between one end of the light reflector and the light incident surface. The light reflector comprises a reflecting portion (131) obliquely opposite to the light incident surface. The reflecting portion is adapted to receive light beams emitted from the point light source, and reflect the received light into the light incident surface of the light guide plate.

19 Claims, 5 Drawing Sheets

SURFACE LIGHTING DEVICE WITH CLOSED OBLIQUE REFLECTOR

BACKGROUND OF THE INVENTION

1. Field of the Invention

The present invention relates to a surface lighting device, and particularly to a surface lighting device for a liquid crystal display (LCD) or similar apparatus.

2. The Related Art

A typical LCD device comprises a liquid crystal display panel, and a surface lighting device mounted under the liquid crystal display panel for supplying light beams thereto. The surface lighting device mainly comprises one or more light sources for emitting light beams, and a light guide plate. The light guide plate receives the emitted light beams via a light incident surface thereof, and emits the light beams via a light output surface thereof in order to uniformly illuminate the liquid crystal display panel.

Conventionally, there are two types of light sources used in a surface light device of an LCD: a linear source such as a cold cathode fluorescent lamp (CCFL), and a point light source such as a light emitting diode (LED). In general, it is more difficult to obtain uniform illumination when using a point light source compared with using a linear source, due to the divergent angles of light emitted from the point light source. For example, LEDs used as light sources emit light beams having a divergent angle in the range from 30° to 130°. Thus, a light guide plate using LEDs as light sources generally yields a plurality of dark areas between adjacent LEDs. U.S. Pat. No. 6,502,948 ("the '948 patent") issued to Iwatsuki discloses a conventional surface lighting device which overcomes the above-mentioned problem. Referring to FIG. 9 of the '948 patent, a surface lighting device includes a stick light guide body 16 mounted between two LEDs 20a, 20b for transferring light beams emitting from the LEDs 20a, 20b into a light guide plate 12. The stick light guide body 16 is parallel to a light incident surface of the light guide plate 12, and a length of the stick light guide body 16 approximately coincides with a length of the light incident surface. This configuration has the LEDs 20a, 20b cooperating with the stick light guide body 16 to provide light beams. That is, the combination functions as a linear light source to provide uniform light beams, and does not cause dark areas.

However, in the above-described configuration, one stick light guide body 16 needs two LEDs cooperating therewith, which increases costs. In addition, as seen in FIGS. 7(B) and 9–11 of the '948 patent, since a light emitting surface E1 of the LED 20a is positioned outside the light stick guide body 16, light leakage therebetween occurs. That is, the stick light guide body 16 cannot completely utilize the light beams emitted from LEDs 20a, 20b. Furthermore, the LEDs 20a, 20b and the stick light guide body 16 are provided at one side of the light guide plate 12 only. It is therefore relatively difficult for the surface lighting device to produce uniform emitting light.

It is desired to provide an improved surface lighting device for use in a liquid crystal display device which overcomes the above-described problems.

SUMMARY OF THE INVENTION

An object of the present invention is to provide a surface lighting device using only one LED as a light source.

Another object of the present invention is to provide a surface lighting device capable of improving utilization of light beams emitted from an LED thereof.

A further object of the present invention is to provide a surface lighting device which provides enhanced uniform illumination and brightness.

To achieve the above objects, a surface lighting device in accordance with the present invention includes a light guide plate, a point light source, and a light reflector substantially juxtaposed with the light guide plate. The light guide plate has a light incident surface. The point light source is located between one end of the light reflector and the light incident surface. The light reflector comprises a reflecting portion obliquely opposite to the light incident surface. The reflecting portion is adapted to receive light beams emitted from the point light source, and reflect the received light into the light incident surface of the light guide plate. Various configurations of the light reflector can be adopted to achieve this purpose. Because the light reflector has the oblique reflecting portion, more received light can be reflected away from its original transmitting path to provide more reflectivity. In addition, because the point light source is positioned inside the light reflector, all the light emitted from the point light source transmits in a close space of the light reflector. In further embodiments, a pair of opposite point light sources with corresponding light reflectors is utilized.

Other objects, advantages, and novel features of the present invention will become more apparent from the following detailed description when taken in conjunction with the accompanying drawings, in which:

DETAILED DESCRIPTION OF THE INVENTION

Figure 1:
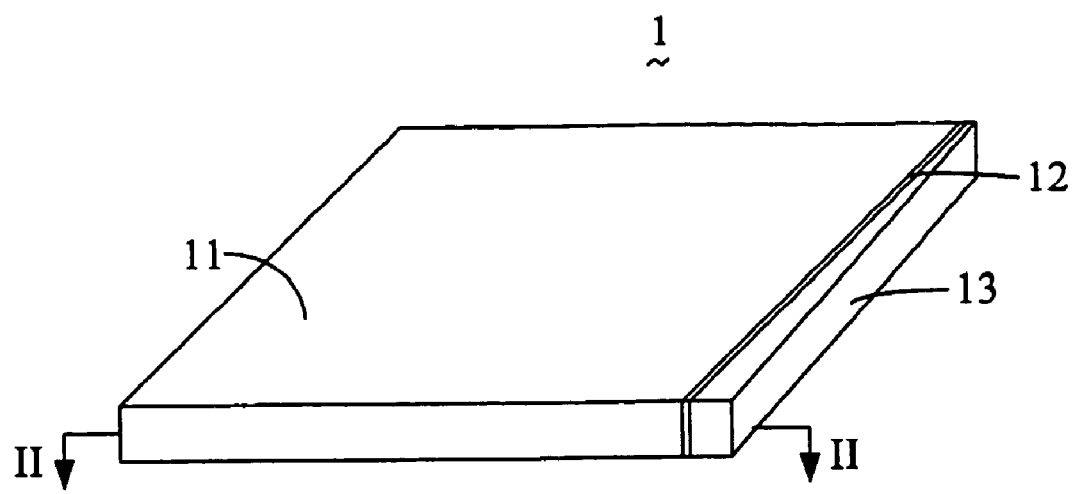
FIG. 1 is an isometric view of a first surface lighting device according to the present invention.
Figure 2:
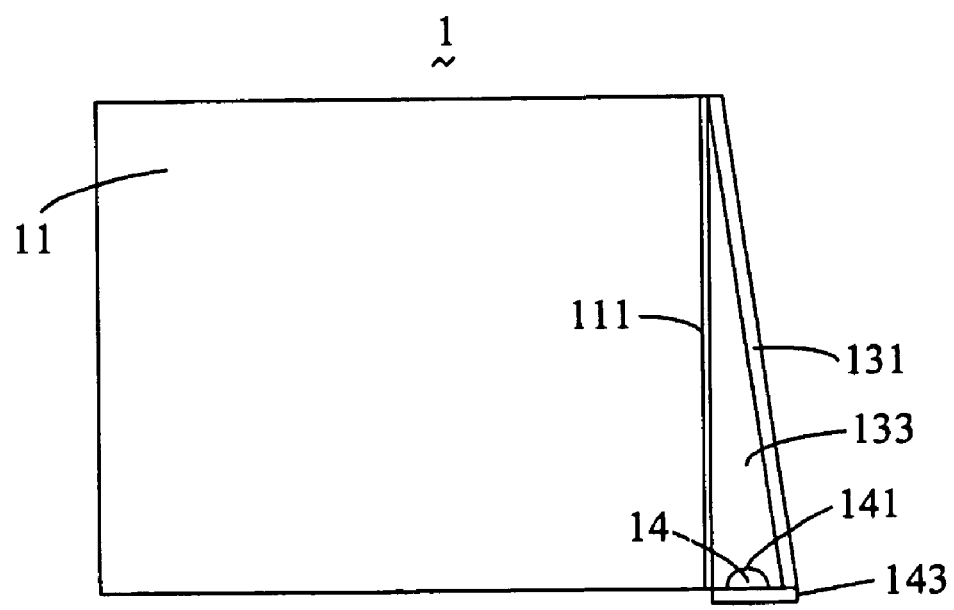
FIG. 2 is a schematic cross-sectional view taken along line II—II of FIG. 1.
Figure 3:
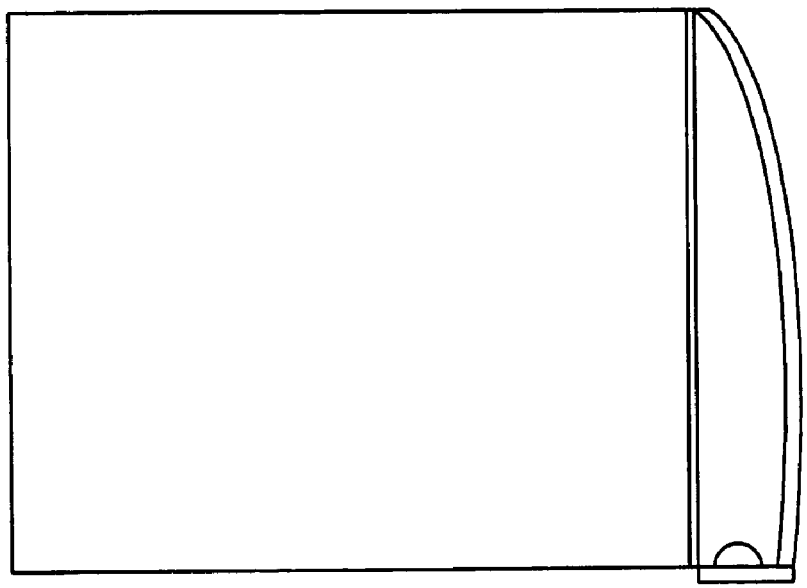
FIGS. 3–7 are respective schematic cross-sectional views and an isometric view, showing various alternative embodiments of a light reflector of the surface lighting device of FIG. 1 and the surface lighting device itself.
Figure 4:
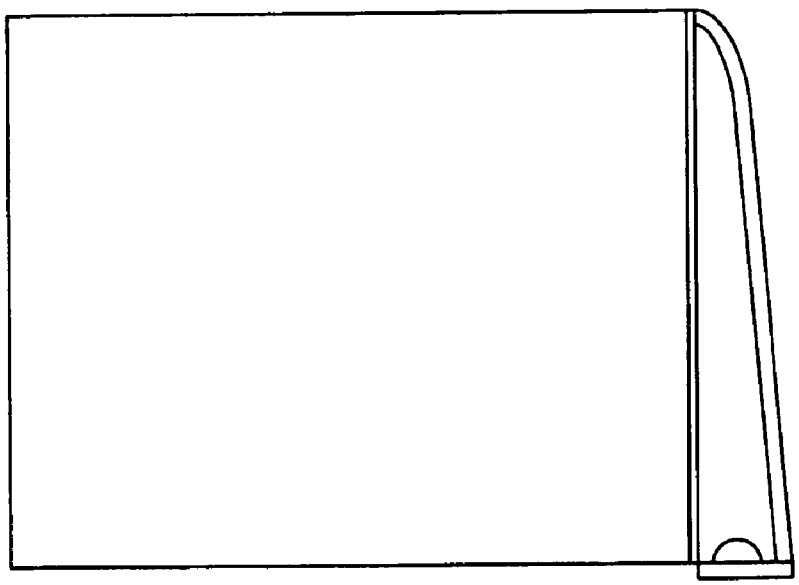

Referring to FIGS. 1–2, a first surface lighting device 1 in accordance with the present invention is used to illuminate a liquid crystal display panel. The surface lighting device 1 comprises a light guide plate 11, a brightness enhancement film 12, a light reflector 13, and an LED 14 for providing light beams.

The light guide plate 11 is a rectangular slab of transparent material such as acrylic resin, polycarbonate resin, polyvinyl chloride, or glass. The light guide plate 11 comprises a light incident surface 111, a light output surface (not labeled) adjoining the light incident surface 111, and a bottom surface (not labeled) opposite to the light output surface. The light output surface and/or the bottom surface of the light guide plate 11 can be formed with a dot-pattern of light diffusers (not shown) or with V-cut grooves (not shown), for scattering incident light and improving a brightness and uniformity of the light guide plate 11.

The brightness enhancement film 12 is coated on the light incident surface 111 of the light guide plate 11 for improving a brightness of the light guide plate 1. Alternatively, a plurality of V-cut grooves (not shown) can be formed in the light incident surface 111 instead of using the brightness enhancement film 12, for improving the brightness of the light guide plate 11.

The light reflector 13 is substantially juxtaposed with the light guide plate 11. The light reflector 13 comprises a sidewall 131, and a planar top wall (not labeled) and a planar bottom wall (not labeled) adjoining the sidewall 131. The sidewall 131 is obliquely opposite to the light incident surface 111. That is, the sidewall 131 has a fixed end (not labeled) connecting with the light incident surface 111, and an opposite free end (not labeled) spaced apart from the light incident surface 111. In addition, the sidewall 131 further includes a dot-pattern (not shown) formed thereon or a plurality of V-cut grooves (not shown) formed therein, for improving a brightness and uniformity of reflected light.

The LED 14 is disposed between the free end of the sidewall 131 and the brightness enhancement film 12. The LED 14 is fixed on a mount portion 143, and a light emitting surface 141 of the LED 14 is located inside the light reflector 13.

In use, the light reflector 13, the light incident surface 111 and the mount portion 143 coupled together define a closed space 133 therebetween. The space 133 receives light beams emitted from the LED 14, and the light beams are reflected into the light guide plate 11.

Figure 5:
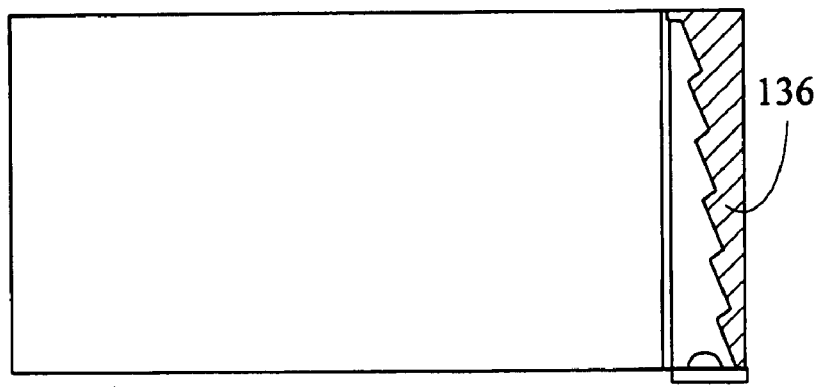
Figure 6:
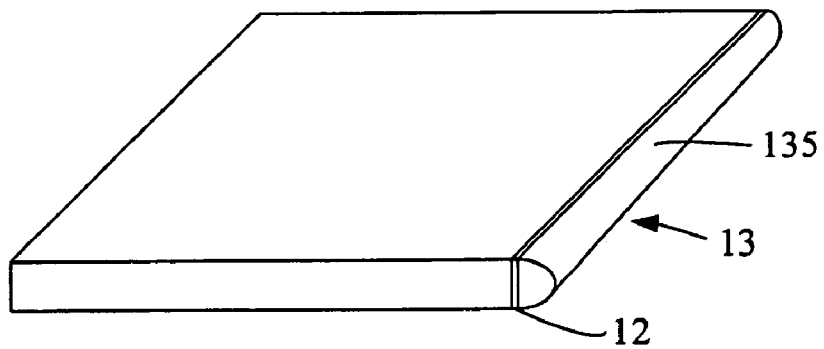
Figure 7:
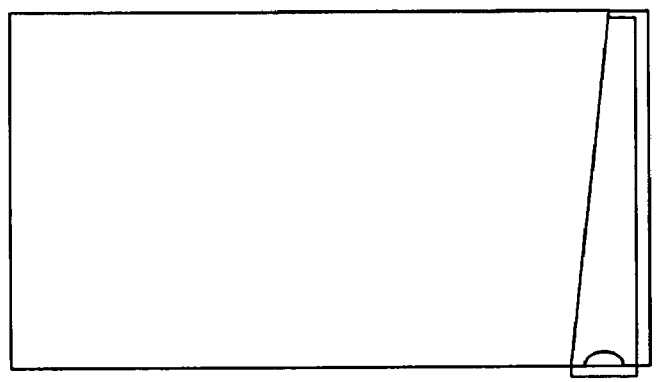

FIGS. 3–7 show alternative embodiments of the surface lighting device 1. These embodiments are similar to the above-described first surface lighting device 1, except than the sidewall 131 of the light reflector 13 has different shapes. The sidewall shown in FIG. 3 has an arcuate shape. The sidewall shown in FIG. 4 has a straight main portion and an arcuate end connecting with the light incident surface 111. The sidewall shown in FIG. 5 is formed parallel to the light incident surface 111 of the light guide plate 11, and has a plurality of prisms 136 formed on an inside thereof. The prisms 136 are arranged in a line opposite from the light incident surface 111, and function as reflector portions. The sidewall 135 shown in FIG. 6 is curved and integrated with curved top and bottom walls of the light reflector 13. That is, the sidewall 135 has an arch-shaped cross-section. A top edge of the sidewall 135 adjoins a top edge of the light incident surface 111, and a bottom edge of the sidewall 135 adjoins a bottom edge of the light incident surface 1111. The sidewall shown in FIG. 7 is L-shaped. The light guide plate is trapezoidal, and a main portion of the sidewall is obliquely opposite to a light incident surface of the light guide plate. An overall configuration of the combined light guide plate and light reflector is rectangular.

Figure 8:
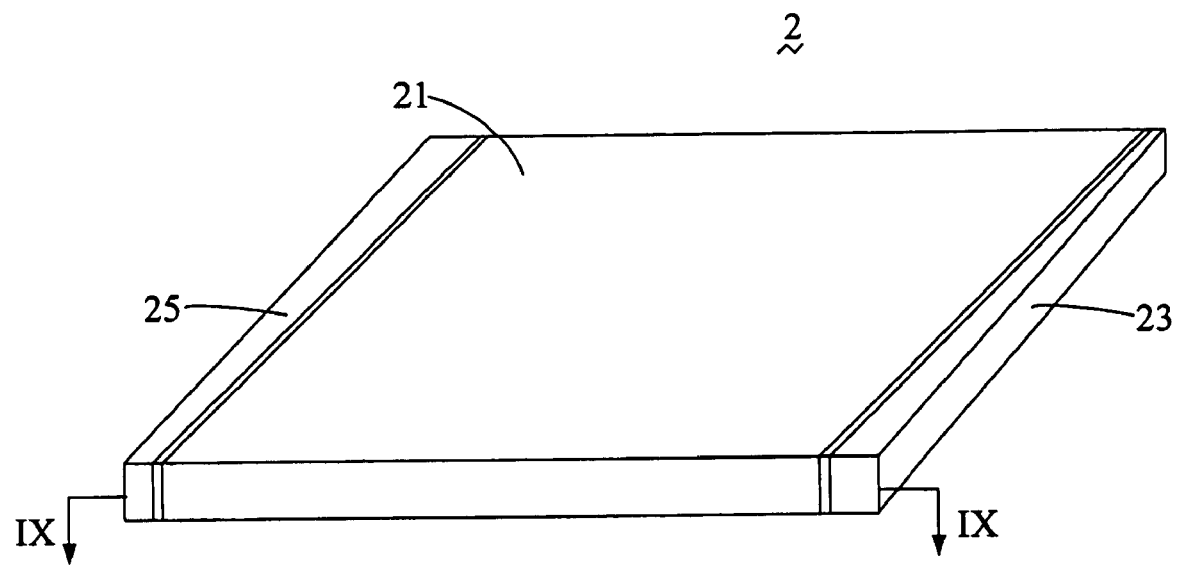
FIG. 8 is an isometric view of a second surface lighting device according to the present invention.
Figure 9:
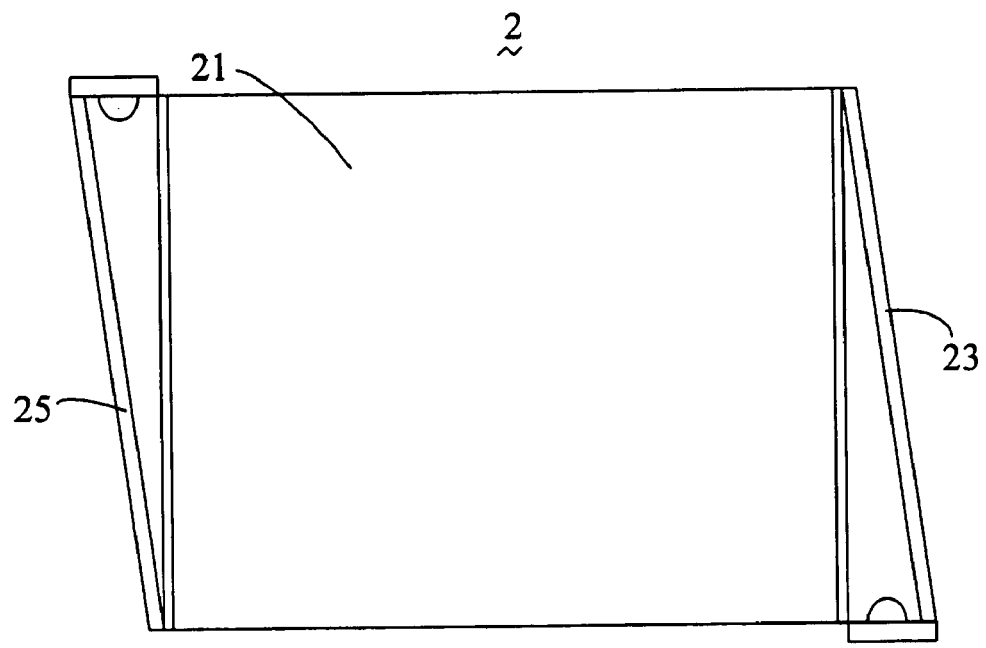
FIG. 9 is a schematic cross-sectional view taken along line IX—IX of FIG. 8.
Figure 10:
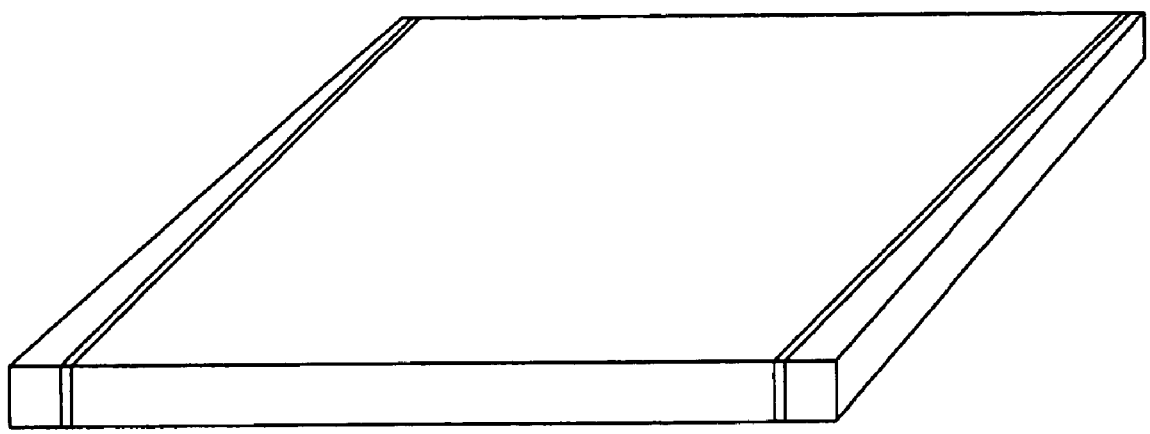
FIGS. 10–11 are respective isometric and schematic cross-sectional views showing an alternative embodiment of light reflectors of the surface lighting device of FIG. 8.
Figure 11:
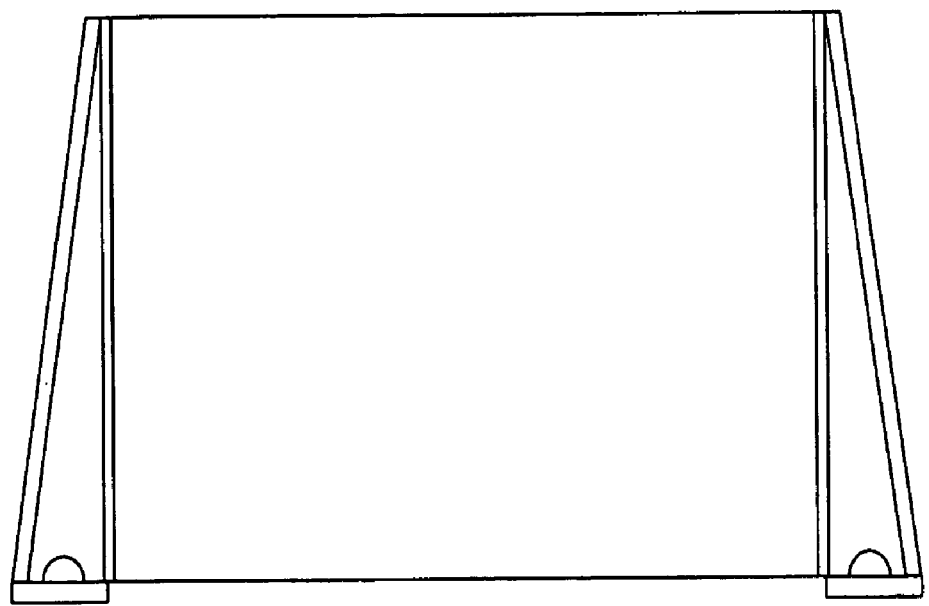

FIGS. 8 and 9 show a second surface lighting device 2 according to the present invention. The surface lighting device 2 comprises two LEDs at opposite sides thereof respectively, for providing enhanced uniform emitting light. The surface lighting device 4 has two light reflectors 23, 25 arranged at opposite sides of a light guide plate 21 respectively, corresponding to the LEDs. The light reflectors 23, 25 are arranged opposite to each other, such that the LEDs are diagonally opposite from each other. FIGS. 10–11 shows a third surface lighting device 3. The surface lighting device 3 is similar to the surface lighting device 2, except that two light reflectors are arranged symmetrically opposite to each other at the opposite sides of the light guide plate.

In addition, each light reflector 23, 25 of the surface lighting device 2 and each light reflector of the surface lighting device 3 can have the sidewall thereof configured according to any of the various alternative embodiments described above in relation to the sidewall 131 of the light reflector 13, as shown in FIGS. 3–7.

Advantages of the present invention include the following. First, each light reflector of the present invention needs only one LED coupled thereto, thereby reducing costs. Second, each light reflector has a reflecting portion obliquely opposite to a corresponding light incident surface. Compared to the conventional stick light guide body, this configuration can reflect more received light away from its original transmitting path and provide more reflectivity. Third, the light emitting surface 141 of the LED 14 is positioned inside the reflector 13, so that all the light emitted from the LED 14 transmits in the close space 133. This maximizes utilization of the light beams emitted from the LED 14. In addition, when two LEDs are used as described, the two light reflectors arranged on opposite sides of the light guide plate can increase a uniformity of light output from the surface lighting device. Furthermore, the brightness enhancement film 12 sandwiched between the light incident surface 111 and the reflector 13 can increase the brightness of the surface lighting device 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A surface lighting device for a display device, comprising:
    a light guide plate having a light incident surface;
    a light reflector substantially juxtaposed with the light guide plate, the light reflector having a reflecting portion obliquely opposite to the light incident surface along a lengthwise direction of the light incident surface; and
    a point light source for emitting light beams, the point light source located between one end of the light reflector and the light incident surface, the point light source having a light emitting surface located inside the light reflector;
    wherein the light reflector receives the light beams emitted from the point light source, and reflects the light beams into the light incident surface of the light guide plate.

2. The surface lighting device as claimed in claim 1, further comprising a brightness enhancement film sandwiched between the light incident surface and the light reflector.

3. The surface lighting device as claimed in claim 1, wherein the reflecting portion is a sidewall of the light reflector, and the light reflector further comprises a planar top wall and a planar bottom wall adjoining the sidewall.

4. The surface lighting device as claimed in claim 1, wherein the light reflector has an arch-shaped cross-section.

5. The surface lighting device as claimed in claim 1, wherein the reflecting portion comprises a plurality of prisms formed on an inside of the light reflector.

6. The surface lighting device as claimed in claim 1, wherein the light reflector is generally L-shaped.

7. The surface lighting device as claimed in claim 1, wherein an opposite end of the light reflector connects with the light incident surface.

8. The surface lighting device as claimed in claim 7, wherein said opposite end is arcuate.

9. The surface lighting device as claimed in claim 7, wherein the light reflector is arcuate.

10. The surface lighting device as claimed in claim 1, wherein the surface lighting device comprises two light reflectors and two corresponding point light sources, the light reflectors and the light sources being arranged at opposite sides of the light guide plate respectively.

11. The surface lighting device as claimed in claim 10, wherein the light reflectors are arranged symmetrically opposite to each other at the opposite sides of the light guide plate.

12. The surface lighting device as claimed in claim 10, wherein the two light reflectors are arranged opposite to each other such that the point light sources are diagonally opposite from each other.

13. A surface lighting device for a display device, comprising: a light guide plate having a light incident surface; a mount portion for fixing a point light source thereon; and a light reflector coupled with the light incident surface of the guide plate; wherein, the light guide plate, the mount portion and the light reflector cooperate together to define a closed space therebetween, said space being tapered in a direction away from the point light source.

14. The surface lighting device as claimed in claim 13, wherein a light emitting surface of the point light source is located inside the space.

15. The surface lighting device as claimed in claim 13, wherein said space is essentially of a triangular configuration, and the mounting portion is one side of said triangular configuration and essentially extends in a lengthwise direction of the light guide plate.

16. A surface lighting device for a display device, comprising:
a light guide plate having a light incident surface; and
a light reflector coupled with the light guide plate and having a sidewall opposite to the light incident surface;
wherein, one end of the sidewall connects with the light incident surface, an opposite end of the sidewall is spaced apart from the light incident surface, a point light source is provided between the opposite end of the sidewall and the light incident surface.

17. The surface light device as claimed in claim 16, wherein the point light sources is directed toward said end connecting said side wall and said light incident surface.

18. The surface lighting device as claimed in claim 16, wherein the point light source is positioned on a mount portion.

19. The surface lighting device as claimed in claim 18, wherein the mount portion, the light guide plate and the light reflector cooperatively form a closed space therebetween.

* * * * *